US012288400B2

(12) United States Patent
Koay et al.

(10) Patent No.: US 12,288,400 B2
(45) Date of Patent: Apr. 29, 2025

(54) METHOD AND SYSTEM FOR CARRYING OUT ITERATIVE APPEARANCE SEARCHING

(71) Applicant: MOTOROLA SOLUTIONS, INC., Chicago, IL (US)

(72) Inventors: Kenney Koay, Simpang Ampat (MY); Rosnah Antong, Perai (MY); Nur Diyana Mohd Asri, Bayan Lepas (MY); Poh Imm Goh, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 105 days.

(21) Appl. No.: 18/470,454

(22) Filed: Sep. 20, 2023

(65) Prior Publication Data
US 2025/0095372 A1    Mar. 20, 2025

(51) Int. Cl.
*G06V 20/52* (2022.01)
*G06V 40/20* (2022.01)
*G06V 20/58* (2022.01)

(52) U.S. Cl.
CPC .............. *G06V 20/52* (2022.01); *G06V 40/20* (2022.01)

(58) Field of Classification Search
CPC ........ G06V 20/52; G06V 40/20; G06V 20/44; G06V 20/58
USPC .......................... 348/169, 61, 207.99, 208.14
See application file for complete search history.

(56) References Cited

U.S. PATENT DOCUMENTS

| | | | |
|---|---|---|---|
| 9,159,362 B2 | 10/2015 | Fathi et al. | |
| 10,121,515 B2 | 11/2018 | Doumbouya et al. | |
| 10,726,312 B2* | 7/2020 | Butt | G06V 10/143 |
| 11,037,571 B2 | 6/2021 | Alcock et al. | |
| 2020/0142928 A1 | 5/2020 | Mei et al. | |
| 2021/0034671 A1* | 2/2021 | Lemay | H04N 23/611 |
| 2021/0279450 A1* | 9/2021 | Niino | H04N 7/18 |
| 2022/0171986 A1 | 6/2022 | Alcock et al. | |

(Continued)

FOREIGN PATENT DOCUMENTS

| | | |
|---|---|---|
| CN | 107169461 A | 9/2017 |
| CN | 109784177 A | 5/2019 |

(Continued)

OTHER PUBLICATIONS

The International Search Report and the Written Opinion, corresponding patent application No. PCT/US2024/045768, filed Sep. 9, 2024, mailed Dec. 5, 2024, all pages.

(Continued)

*Primary Examiner* — Daquan Zhao (57) ABSTRACT

A method and system for carrying out iterative appearance searching is disclosed. The method includes employing at least one first reference image to carry out a first instance, computer vision-driven appearance search of first video data captured across a respective first set of a plurality of first security cameras. The method also includes obtaining a second reference image, having a respective relevance confidence that satisfies a confidence threshold condition, from the portion of the first video data. The method also includes employing the second reference image for a second instance, computer vision-driven appearance search of second video data captured across a respective second set of a plurality of second security cameras.

20 Claims, 3 Drawing Sheets

(56) References Cited

U.S. PATENT DOCUMENTS

2023/0145362 A1* 5/2023 Wang ............... G06F 16/75
                                                382/103
2024/0061877 A1* 2/2024 Yoshida ............ G06T 7/70

FOREIGN PATENT DOCUMENTS

| CN | 112949396 A | 6/2021 |
| JP | 5888770 B2 | 3/2016 |
| JP | 6837356 B2 | 3/2021 |
| KR | 20230026973 A | 2/2023 |
| WO | 2016137169 A1 | 9/2016 |

OTHER PUBLICATIONS

Nadeem, Adnan, Muhammad Ashraf, Nauman Qadeer, Kashif Rizwan, Amir Mehmood, Ali AlZahrani, Fazal Noor, and Qammer H. Abbasi. 2022. "Tracking Missing Person in Large Crowd Gathering Using Intelligent Video Surveillance" Sensors 22, No. 14: 5270. https://doi.org/10.3390/s22145270.

* cited by examiner

METHOD AND SYSTEM FOR CARRYING OUT ITERATIVE APPEARANCE SEARCHING

BACKGROUND

Automated security systems typically employ video cameras or other image capturing devices or sensors to collect image data such as video or video footage. In the simplest systems, images represented by the image data are displayed for contemporaneous screening by security personnel and/or recorded for later review after a security breach. In those systems, the task of detecting and classifying visual objects of interest is performed by a human observer. A significant advance occurs when the system itself is able to perform object detection and classification, either partly or completely.

In a typical security camera system, one may be interested in detecting objects such as humans, vehicles, animals, etcetera that move through the environment. However, if for example a child is lost in a large shopping mall, it could be very time consuming for security personnel to manually review video footage for the lost child. Computer-implemented detection of objects in the images represented by the image data captured by the cameras can significantly facilitate the task of reviewing relevant video segments by the security personnel in order to find the object that may need to be found quickly.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a computer-implemented method for carrying out iterative appearance searching. The computer-implemented method includes inputting, to an at least one processor, at least one first reference image within which a missing object is not shown. The computer-implemented method also includes employing the at least one first reference image to carry out a first instance, computer vision-driven appearance search of first video data captured across a respective first set of a plurality of first security cameras. The first computer vision-driven appearance search determines that the missing object is included in a portion of the first video data that has been recorded. The computer-implemented method also includes obtaining a second reference image, having a respective relevance confidence that satisfies a confidence threshold condition, from the portion of the first video data. The missing object is shown within the second reference image. The computer-implemented method also includes employing the second reference image for a second instance, computer vision-driven appearance search of second video data captured across a respective second set of a plurality of second security cameras. The second instance, computer vision-driven appearance search occurs after the first instance, computer vision-driven appearance search without any intervening user input. The computer-implemented method also includes displaying video or image data results from the second instance, computer vision-driven appearance search at least when the video or image data results meets search success criteria.

In accordance with another example embodiment, there is provided a system that includes at least one processor configured to receive at least one first reference image within which a missing object is not shown. The system also includes at least one electronic storage medium storing program instructions that when executed by the at least one processor cause the at least one processor to perform employing the at least one first reference image to carry out a first instance, computer vision-driven appearance search of first video data captured across a respective first set of a plurality of first security cameras. The first computer vision-driven appearance search determines that the missing object is included in a portion of the first video data that has been recorded. The at least one processor is also caused to perform obtaining a second reference image, having a respective relevance confidence that satisfies a confidence threshold condition, from the portion of the first video data. The missing object is shown within the second reference image. The at least one processor is also caused to perform employing the second reference image for a second instance, computer vision-driven appearance search of second video data captured across a respective second set of a plurality of second security cameras. The second instance, computer vision-driven appearance search occurs after the first instance, computer vision-driven appearance search without any intervening user input. A display screen is caused to display video or image data results from the second instance, computer vision-driven appearance search at least when the video or image data results meets search success criteria.

Each of the above-mentioned embodiments will be discussed in more detail below, starting with example system and device architectures of the system in which the embodiments may be practiced, followed by an illustration of processing blocks for achieving an improved technical method, device, and system for carrying out iterative appearance searching.

Example embodiments are herein described with reference to flowchart illustrations and/or block diagrams of methods, apparatus (systems) and computer program products according to example embodiments. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The term "object" as used herein is understood to have the same meaning as would normally be given by one skilled in the art of video analytics, and examples of objects may include moving objects such as, for instance, people, animals and vehicles.

Further advantages and features consistent with this disclosure will be set forth in the following detailed description, with reference to the figures.

Figure 1:
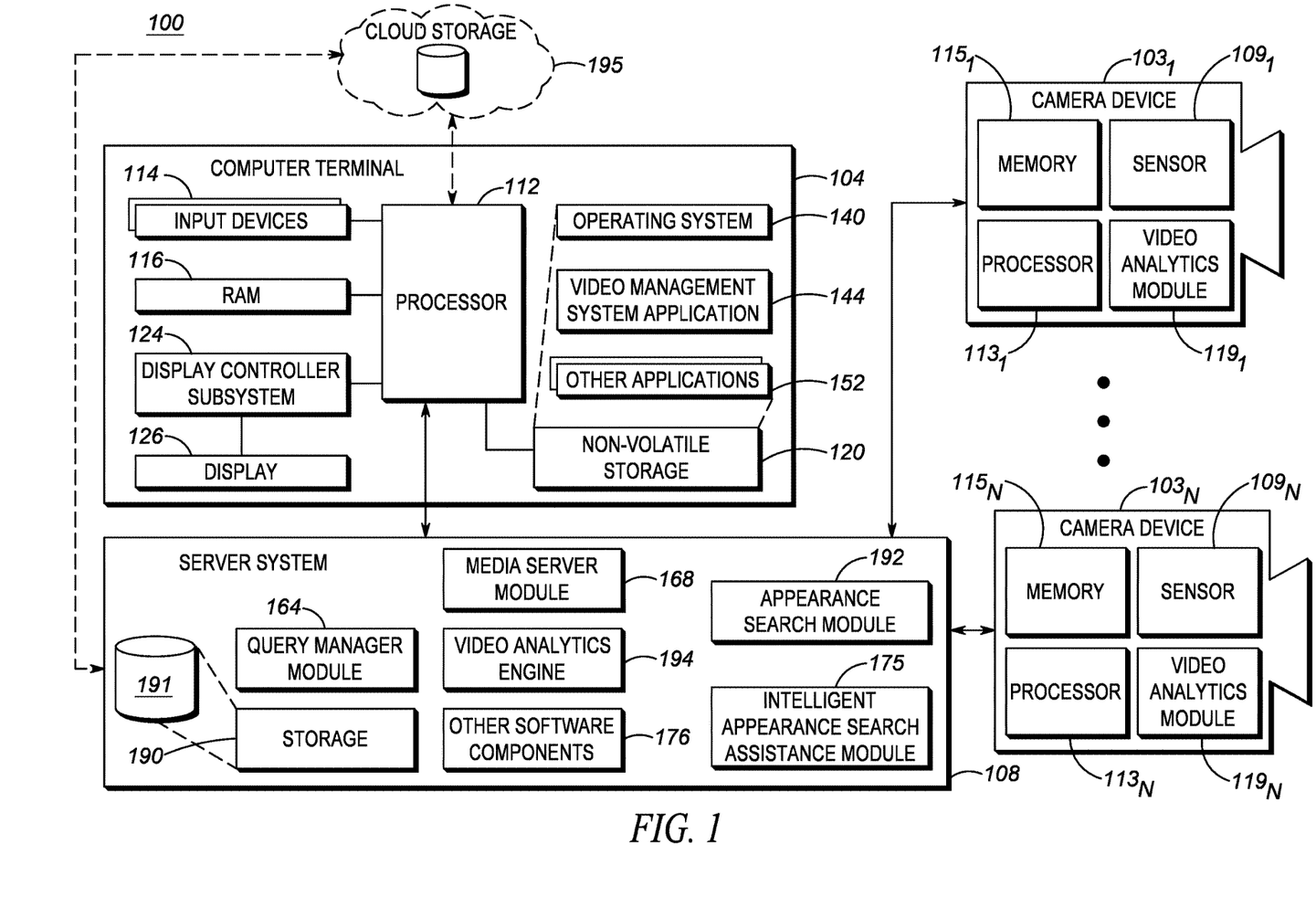
FIG. 1 is a block diagram of a security system in accordance with example embodiments.

Referring now to the drawings, and in particular FIG. 1 which is a block diagram of an example security system 100 within which methods in accordance with example embodiments can be carried out. Included within the illustrated security system 100 are one or more computer terminals 104 and a server system 108. In some example embodiments, the computer terminal 104 is a personal computer system (such as, for instance, a desktop computer); however in other example embodiments the computer terminal 104 is a mobile device such as, for example, a tablet, a phablet, a two-way radio, a smart phone or a personal digital assistant (PDA); a laptop computer; a desktop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the computer terminal 104 rather than within the server system 108.

The computer terminal 104 communicates with the server system 108 through one or more networks. These networks can include the Internet, or one or more other public/private networks coupled together by network switches or other communication elements. As an example and not by way of limitation, the computer terminal 104 can communicate with an ad-hoc network, a Personal Area Network (PAN), a Local Area Network (LAN), a Wide Area Network (WAN), a Metropolitan Area Network (MAN), or one or more portions of the Internet or a combination of two or more of these. One or more portions of one or more of these networks may be wireless. As an example, the computer terminal 104 may be capable of communicating with a Wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these.

The computer terminal 104 includes at least one processor 112 that controls the overall operation of the computer terminal. The processor 112 interacts with various subsystems such as, for example, input devices 114 (such as a selected one or more of a keyboard, mouse, scanner, touch pad, roller ball and microphone/voice control means, for example), random access memory (RAM) 116, non-volatile storage 120, display controller subsystem 124 and other subsystems. The display controller subsystem 124 interacts with display screen 126 and it renders graphics and/or text upon the display screen 126.

Still with reference to the computer terminal 104 of the security system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, video management system application 144, and other applications 152, or parts thereof, may be temporarily loaded into a volatile store such as the RAM 116. The processor 112, in addition to its operating system functions, can enable execution of the various software applications on the computer terminal 104.

Regarding the video management system application 144, this can be run on the computer terminal 104 and may include various application components such as, for example, a User Interface (UI) module. The UI module may be cooperatively coupled with a search session manager module in order to enable a human user to carry out actions related to providing input in relation images, live video and video recordings (such as, for example, input to facilitate carrying out, object tracking, one or more appearance searches, etcetera). Also, regarding the aforementioned search session manager module, this provides a communications interface between the search UI module and a query manager module 164 of the server system 108. In at least some examples, the search session manager module communicates with the query manager module 164 through the use of Remote Procedure Calls (RPCs). The query manager module 164 receives and processes queries originating from the computer terminal 104, which may facilitate retrieval and delivery of specifically defined video (and respective metadata) in support of, for example, client-side video review, appearance searching, video export, managing event detection, object tracking, etc. In this regard, the query manager module 164 is communicatively coupled to one or more data stores 190 (described later herein in more detail) and an appearance search module 192 that operates within the server system 108 in support of appearance searches.

Still with reference to FIG. 1, the server system 108 includes several software components (besides the query manager module 164 already described) for carrying out other functions of the server system 108. For example, the server system 108 includes a media server module 168. The media server module 168 handles client requests related to storage and retrieval of security video taken by camera devices $103_1$-$103_N$ in the security system 100. The server system 108 also includes a video analytics engine 194. The video analytics engine 194 can, in some examples, be any suitable one of known commercially available software that carry out computer vision related functions (complementary to any video analytics performed in the security cameras) as understood by a person of skill in the art. Other suitable implementation alternatives, apparent to those skilled in the art, are also contemplated.

The server system 108 also includes an intelligent appearance search assistance module 175 which automates the second and any subsequent iterations in an iterative appearance search, by way of at least one or more of trained learning machine(s), confidence score calculations, and success criteria evaluations. The server system 108 also includes a number of other software components 176. These other software components will vary depending on the requirements of the server system 108 within the overall system. As one example, the other software components 176 might include special test and debugging software, or software to facilitate version updating of modules within the server system 108.

Regarding the data store 190, this comprises, for example, one or more databases 191 which may facilitate the organized storing of recorded security video, other sensor data, etc. in accordance with example embodiments. The one or more databases 191 may also contain metadata related to, for example, the recorded security video that is storable within the one or more data stores 190. Examples of metadata that may be expected to be derived directly or indirectly from video data include location in field of view, object ID, bounding box-related data, tracking position relative to field of view, etc. The one or more databases 191 may also contain records and data relevant to the intelligent appearance search assistance module 175 and the appearance search module 192.

Optionally, the security system 100 may include connections to the illustrated one or more cloud services 195. For example, the computer terminal 104 may be connected to the cloud service(s) 195 by the Internet and/or one or more wireless and/or wired wide area networks (examples of which were previously herein detailed). Similarly, the server system 108 may be connected to the cloud service(s) 195 by the Internet and/or one or more wireless and/or wired wide area networks (examples of which were previously herein detailed). The cloud service(s) 195 which may, amongst other things, include neural network(s), and may also include functionality similar and/or complementary to functionality provided by the server system 108. In some examples, the cloud service(s) 195 may support multi-site appearance searching (which is disclosed in, for example, US Pat. Publ. No. 2022/0171986 entitled "Obtaining Potential Match Results for a Reference Image Across a Plurality of System Sites"). In connection with multi-site appearance searching, the cloud service(s) 195 is communicatively coupled to a plurality of the server systems 108 to run coordinated searching across a plurality of security camera sites, each with their respective server system 108.

The illustrated security system 100 includes a plurality of camera devices $103_1$-$103_N$ (hereinafter interchangeably referred to as "cameras $103_1$-$103_N$" when referring to all of the illustrated cameras, or "camera 103" when referring to any individual one of the plurality) being operable to capture a plurality of images and produce image data representing the plurality of captured images. The camera 103 is an image capturing device and includes security video cameras. Furthermore, it will be understood that the security system 100 includes any suitable number of cameras (i.e. n is any suitable integer greater than one).

In some examples, some or all of the cameras $103_1$-$103_N$ are geographically located within a public premises serviced by the security system 100. Examples of possible public premises include stadiums, shopping malls, schools, hospitals, airports, train stations, etcetera.

The camera 103 includes an image sensor 109 (corresponding to one of the sensors $109_1$-$109_N$ shown in FIG. 1) for capturing a plurality of images. The camera 103 may be a digital video camera and the image sensor 109 may output captured light as a digital data. For example, the image sensor 109 may be a CMOS, NMOS, or CCD. In some embodiments, the camera 103 may be an analog camera connected to an encoder. The illustrated camera 103 may be a 2D camera; however use of a structured light 3D camera, a time-of-flight 3D camera, a 3D Light Detection and Ranging (LiDAR) device, a stereo camera, or any other suitable type of camera within the security system 100 is contemplated.

The image sensor 109 may be operable to capture light in one or more frequency ranges. For example, the image sensor 109 may be operable to capture light in a range that substantially corresponds to the visible light frequency range. In other examples, the image sensor 109 may be operable to capture light outside the visible light range, such as in the infrared (IR) and/or ultraviolet range. In other examples, the camera 103 may be a "multi-sensor" type of camera, such that the camera 103 includes pairs of two or more sensors that are operable to capture light in different and/or same frequency ranges.

The camera 103 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another camera. For example, the dedicated camera may be a security camera, such as any one of a Pan-Tilt-Zoom (PTZ) camera, dome camera, in-ceiling camera, box camera, and bullet camera.

Additionally, or alternatively, the camera 103 may include an embedded camera. It will be understood that an embedded camera herein refers to a camera that is embedded within a device that is operational to perform functions that are unrelated to the captured image or video. For example, the embedded camera may be a camera found on any one of a drone device, a vehicle, a security panel, doorbell device, etc.

The camera 103 includes one or more processors 113 (corresponding to one of the processors $113_1$-$113_N$ shown in FIG. 1), one or more video analytics modules 119 (corresponding to one of the video analytics modules $119_1$-$119_N$ shown in FIG. 1), and one or more memory devices 115 (corresponding to one of the memories $115_1$-$115_N$ shown in FIG. 1) coupled to the processors and one or more network interfaces. Regarding the video analytics module 119, this generates metadata outputted to the server system 108. The metadata can include, for example, records which describe various detections of objects such as, for instance, pixel locations for the detected object in respect of a first record and a last record for the camera within which the respective metadata is being generated.

Regarding the memory device 115, this can include a local memory (such as, for example, a RAM and a cache memory) employed during execution of program instructions. Regarding the processor 113, this executes computer program instructions (such as, for example, an operating system and/or software programs), which can be stored in the memory device 115.

In various embodiments the processor 113 may be implemented by any suitable processing circuit having one or more circuit units, including a digital signal processor (DSP), graphics processing unit (GPU) embedded processor, a visual processing unit or a vison processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the camera 103, including the processor 113, may be combined together on one semiconductor chip. For example, the processor 113, the memory device 115 and the network interface of the camera 103 may be implemented within a SOC. Furthermore, when implemented in this way, a general purpose processor and one or more of a GPU or VPU, and a DSP may be implemented together within the SOC.

In various example embodiments, the memory device 115 coupled to the processor 113 is operable to store data and computer program instructions. The memory device 115 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 115 may be operable to store memory as volatile memory, non-volatile memory, dynamic memory, etc. or any combination thereof.

Continuing with FIG. 1, the camera 103 is coupled to the server system 108. In some examples, the camera 103 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the camera 103 and the server system 108 can be any number of known arrangements, examples of which were previously herein detailed. In at least one example embodiment, the camera 103 and the server system 108 are within the same Local Area Network (LAN). In some examples, the camera 103 may be coupled to the server system 108 in a more direct manner than as described above.

Although the security system 100 illustrated in FIG. 1 only explicitly shows image sensor devices coupled to the server system 108, it will be understood that the security system 100 is not limited in contemplated compositions to just image sensor devices. Some examples of the security system 100 include a heterogeneous mixture of both image sensor devices and non-image sensor devices (for example, radar-based devices) coupled to the server system 108.

Figure 2:
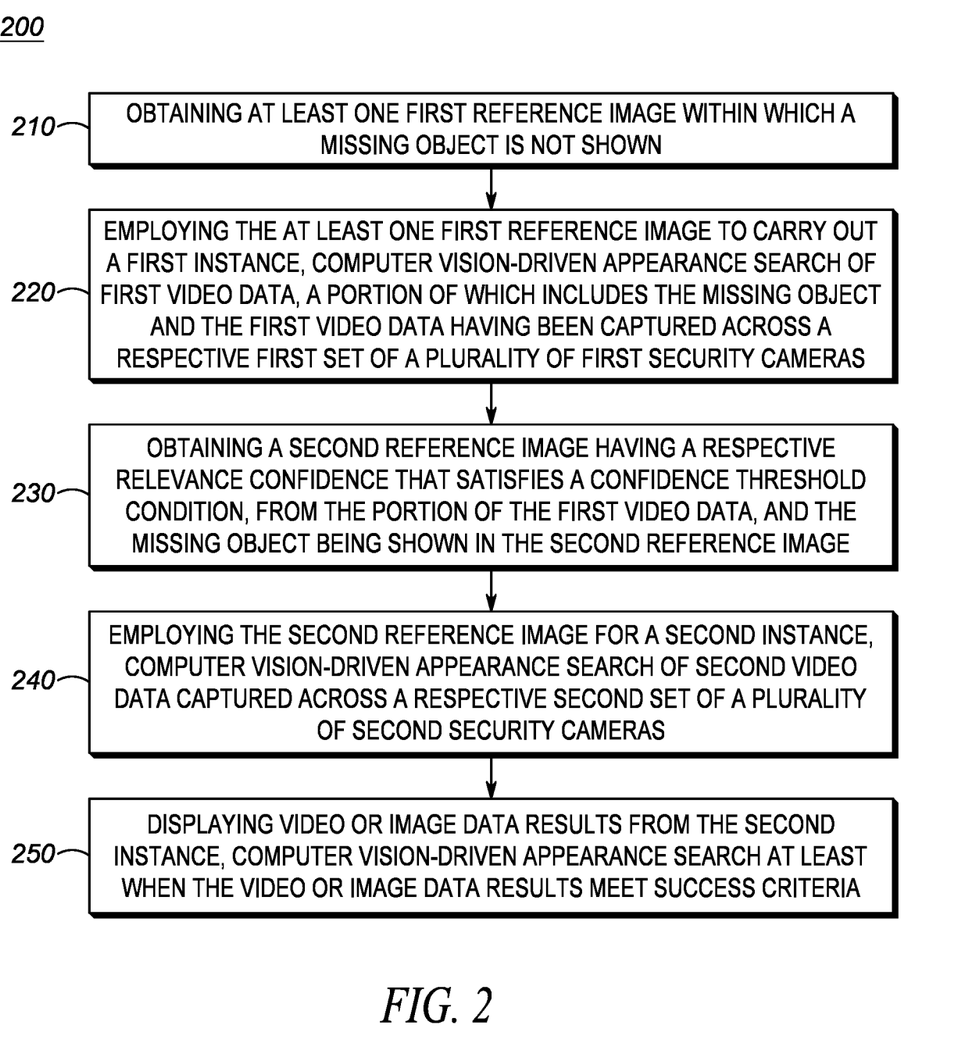
FIG. 2 is a flow chart illustrating a computer-implemented method in accordance with an example embodiment.
Figure 3:
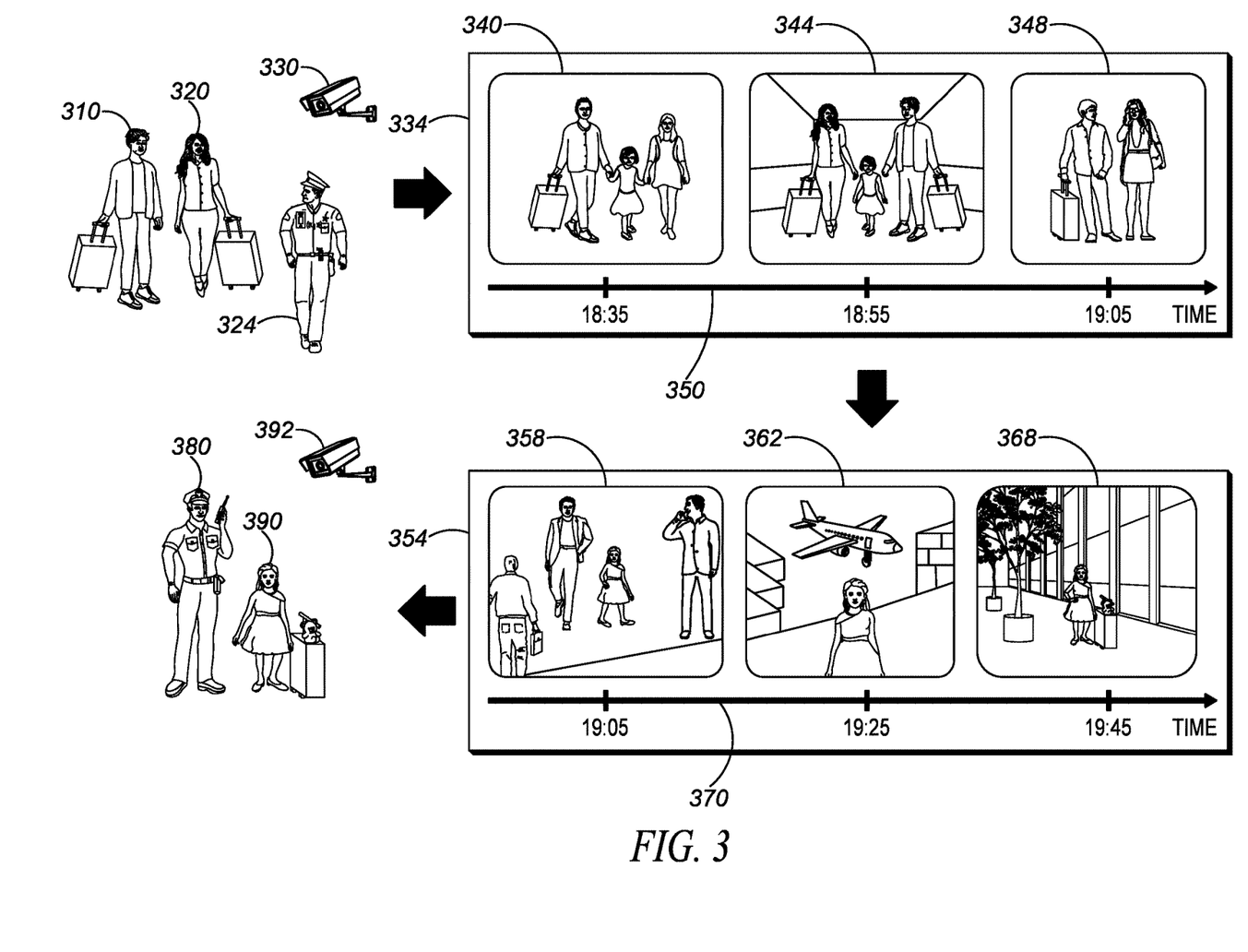
FIG. 3 is a diagram illustrating a lost child search consistent with the example embodiment of FIG. 2.

Reference is made to FIGS. 2 and 3. FIG. 2 is a flow chart illustrating a method 200 in accordance with an example embodiment. FIG. 3 is a diagram illustrating a lost child search consistent with the example embodiment of FIG. 2

Firstly, with reference to the method 200 of FIG. 2, at least one first reference image is obtained (210) (for example, the at least one first reference image may be inputting to an at least one processor). Also, regarding the at least one first reference image, a missing object (object with respect to which a searching process with be concerned) is not shown therein. The action 210 may be further understood with reference to example details shown in FIG. 3. In particular, in the top-left corner of the diagram of FIG. 3, a father 310 and a mother 320 approach a security guard 324 regarding a missing child. To assist these parents, the security guard 324 initiates an appearance searching process, which includes a reference image being captured just then (i.e. contemporaneous with the explanatory dialogue regarding the missing child) by way of security camera 330. In this reference image captured by the security camera 330, the child is missing. (It will be understood that other types of missing objects besides a child are contemplated such as, for example, an incident suspect, a moveable chattel, etcetera.)

The security camera 330 may be, for instance, one of the camera devices $103_1$-$103_N$. Thus, the security camera 330 can be a fixed-location camera, but it can also be any other suitable type of camera (examples of which have already been herein described). Also, in some examples the above-mentioned captured reference image (i.e. the initial reference image for iterative appearance searching) is intelligently selected out from search-supporting video captured from the security camera 330. In other alternative examples, the security camera 330 is actuated to take the reference image as a still image. Besides the security camera 330, the initial reference image may also be captured by any suitable camera.

As mentioned already, the security guard 324 is an example of a person who may initiate the appearance searching process. For instance, the security guard 324 may speak a voice command to a mobile device (i.e. suitable mobile examples of the computer terminal 104 have already herein been previously described). In some examples, this voice command may be defined at least in part to initiate the first instance, computer vision-driven appearance search.

Next in the method 200, the at least one first reference image is employed (220) to carry out a first instance, computer vision-driven appearance search of first video data captured across a respective first set of a plurality of first security cameras. This first computer vision-driven appearance search determines that the missing object is included in a portion of the first video data that has been recorded. In connection with some examples of this missing object determination, visible attributes of the missing object are collected as missing object metadata contemporaneously with the carrying out of the first instance, computer vision-driven appearance search. In connection with even further examples of this missing object determination, visibly exhibited behaviors of the missing object (or even exhibited behaviors of one or more people appearing in the initial reference image) are collected as missing object metadata contemporaneously with the carrying out of the first instance, computer vision-driven appearance search.

Further example detail regarding the above can be seen in FIG. 3, where a portion of a display screen 334 displays search results 340, 344 and 348, from a first instance, computer vision-driven appearance search, along timeline 350, the missing child is shown in the search results 340 and 344 corresponding to times "18:35" and "18:55" respectively. Importantly, neither the father 310 nor the mother 320 need communicate descriptive details of the missing child. The intelligent appearance search assistance module 175 is designed and trained to work cooperatively with the appearance search module 192 to extract this information automatically. This is beneficial in situations where there may be communication issues preventing this information from being quickly and/or accurately obtained. In this regard, causes of these communication issues may include, for example, an abnormal/injured state (e.g. emotional, physical or mental) of the person supplying the information, a language barrier between the person giving and receiving the information, mental capacity (e.g. too young, dementia or other mental disability) of the person supplying the information, etcetera.

Next, and with continuing reference to the method 200 of FIG. 2, a second reference image, having a respective relevance confidence that satisfies a confidence threshold condition (this being determined by, for example, the intelligent appearance search assistance module 175) is obtained (230) from the portion of the first video data, and the missing object is shown within the second reference image. For example, in FIG. 3 either of the images corresponding to the search results 340 and 344 may be employed as the second reference image.

Next in the method 200, the second reference image is employed (240) for a second instance, computer vision-driven appearance search of second video data captured across a respective second set of a plurality of second security cameras. In some examples, this second instance, computer vision-driven appearance search is enabled by missing object metadata that is input to an at least one learning machine (for instance, an at least one learning machine forming part of the video analytics engine 194 shown in FIG. 1). Also, it will be understood that the second instance, computer vision-driven appearance search occurs after the first instance, computer vision-driven appearance search without any intervening user input.

Further example detail regarding the above can be seen in FIG. 3, where a portion of a display screen 354 displays search results 358, 362 and 368, from a second instance, computer vision-driven appearance search. Along timeline 370, the missing child is shown in all of the search results; however importantly the search result 368 is at "19:45", which is much closer in time to when the appearance search process was started than any of the search results from the previous/first instance, computer vision-driven appearance search.

Next in the method 200, video or image data results from the second instance, computer vision-driven appearance search are displayed (250). (The action 250 occurs at least when the video or image data results meets search success criteria determined by, for example, the intelligent appearance search assistance module 175.) For example, the search results of the second instance, computer vision-driven appearance search depicted in FIG. 3 may be considered to meet the success criteria, because they include at least one image of the missing child captured from live (or almost live) video. Thus, the security guard 324 may see at least the search result 368 on a screen of his mobile device (for example, smart phone or two-way radio), and from that he will recognize where in the airport that image was captured from (or alternatively the image may be location-labelled in some manner by the system). Following this, the security guard 324 may radio another security guard 380 proximate the anticipated current location of missing child 390. Also, as shown in the bottom left corner of FIG. 3, the security guard 380 verbally communicates over the radio channel that the child 390 has been safely located proximate to security camera 392.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot carrying out iterative appearance searching, among other features and functions set forth herein).

In the foregoing specification, specific embodiments have been described. However, one of ordinary skill in the art appreciates that various modifications and changes can be made without departing from the scope of the invention as set forth in the claims below. For example, while iterative appearance searching has been described as including a first instance, computer vision-driven appearance search followed by a second instance, computer vision-driven appearance search, any suitable number of searching stages is contemplated. For instance, take the example of application to a situation involving a violent crime victim and employing, in such a situation, iterative appearance searching to find those that may have been involved or have knowledge relevant to the crime. Initially the reference search image employed for a first instance, computer vision-driven appearance search may be an image of the crime victim. Next, the reference search image for a second instance, computer vision-driven appearance search may be an image of the suspect for the crime; however, say for example that the second instance, computer vision-driven appearance search reveals that the suspect is no longer anywhere to be found in live (or nearly live) video, then in such a case (with the previously discussed success criteria not being met) the iterative appearance search continues where the reference search image for a third instance, computer vision-driven appearance search may be an image of a person seen in the recorded video talking to the crime suspect. While this potential acquaintance of the crime suspect may not be the person the police ultimately wish to apprehend, if this potential acquaintance shows up in the live (or nearly live)

video, then at such a point the aforementioned success criteria may in fact be met, because even though this other person is not the person most likely responsible for the crime, there is a greater possibility (i.e. greater possibility than the more directly involved person) of grabbing this person before they disappear, in order to interrogate this potential acquaintance to obtain needed information regarding the crime suspect.

Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server (this contemplated "partly"/ "entirely" possibility is consistent with, for example, the one or more cloud services 195 shown in FIG. 1). In the latter scenario, the remote computer or server may include cloud or other storage, and may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method for carrying out iterative appearance searching, the computer-implemented method comprising:
   inputting, to an at least one processor, at least one first reference image within which a missing object is not shown;
   employing the at least one first reference image to carry out a first instance, computer vision-driven appearance search of first video data captured across a respective first set of a plurality of first security cameras, the first instance, computer vision-driven appearance search determining that the missing object is included in a portion of the first video data that has been recorded;
   obtaining a second reference image, having a respective relevance confidence that satisfies a confidence threshold condition, from the portion of the first video data, and the missing object being shown within the second reference image;
   employing the second reference image for a second instance, computer vision-driven appearance search of second video data captured across a respective second set of a plurality of second security cameras, and wherein the second instance, computer vision-driven appearance search occurs after the first instance, computer vision-driven appearance search without any intervening user input; and
   displaying video or image data results from the second instance, computer vision-driven appearance search at least when the video or image data results meets search success criteria.

2. The computer-implemented method of claim 1 further comprising capturing search-supporting video via a camera, and
   wherein the at least one first reference image is obtained from the search-supporting video.

3. The computer-implemented method of claim 2 wherein the camera is a fixed-location, security camera.

4. The computer-implemented method of claim 2 wherein visibly exhibited behaviors of one or more objects present in the search-supporting video are collected as associated object metadata contemporaneously with the carrying out of the first instance, computer vision-driven appearance search.

5. The computer-implemented method of claim 4 wherein the associated object metadata is input to an at least one learning machine that enables the second instance, computer vision-driven appearance search.

6. The computer-implemented method of claim 1 wherein the missing object is a child, an incident suspect, or a moveable chattel.

7. The computer-implemented method of claim 1 wherein at least one of the first set of first security cameras and the second set of second security cameras are geographically located within a public premises serviced by a security system.

8. The computer-implemented method of claim 1 wherein visible attributes of the missing object are collected as missing object metadata contemporaneously with the carrying out of the first instance, computer vision-driven appearance search.

9. The computer-implemented method of claim 8 wherein the missing object metadata is input to an at least one learning machine that enables the second instance, computer vision-driven appearance search.

10. The computer-implemented method of claim 1 further comprising receiving a voice command via a microphone communicatively coupled to the at least one processor, the voice command defined at least in part to initiate the first instance, computer vision-driven appearance search.

11. A system comprising:
    at least one processor configured to receive at least one first reference image within which a missing object is not shown; and
    at least one electronic storage medium storing program instructions that when executed by the at least one processor cause the at least one processor to perform:
    employing the at least one first reference image to carry out a first instance, computer vision-driven appearance search of first video data captured across a respective first set of a plurality of first security cameras, the first instance, computer vision-driven appearance search determining that the missing object is included in a portion of the first video data that has been recorded;
    obtaining a second reference image, having a respective relevance confidence that satisfies a confidence threshold condition, from the portion of the first video data, and the missing object being shown within the second reference image;
    employing the second reference image for a second instance, computer vision-driven appearance search of second video data captured across a respective second set of a plurality of second security cameras, and wherein the second instance, computer vision-driven appearance search occurs after the first instance, computer vision-driven appearance search without any intervening user input; and causing a display screen to display video or image data results from the second instance, computer vision-driven appearance search at least when the video or image data results meets search success criteria.

12. The system as claimed in claim 11 further comprising a video camera configured to capture search-supporting video, and wherein the at least one first reference image is obtained from the search-supporting video.

13. The system of claim 12 wherein the video camera is a fixed-location, security camera amongst the first set of the first security cameras.

14. The system of claim 11 wherein the missing object is a child, an incident suspect, or a moveable chattel.

15. The system of claim 11 wherein at least one of the first set of first security cameras and the second set of second security cameras are geographically located within a public premises serviced by a security system.

16. The system of claim 11 wherein visible attributes of the missing object are collected as missing object metadata contemporaneously with the carrying out of the first instance, computer vision-driven appearance search.

17. The system of claim 16 wherein the at least one processor is configured to implement at least one learning machine to receive the missing object metadata as input, enabling the second instance, computer vision-driven appearance search.

18. The system of claim 11 wherein visibly exhibited behaviors of the missing object are collected as missing object metadata contemporaneously with the carrying out of the first instance, computer vision-driven appearance search.

19. The system of claim 18 wherein the at least one processor is configured to implement at least one learning machine to receive the missing object metadata as input, enabling the second instance, computer vision-driven appearance search.

20. The system of claim 11 further comprising a microphone communicatively coupled to the at least one processor, the microphone configured to receiving a voice command defined at least in part to initiate the first instance, computer vision-driven appearance search.

* * * * *